United States Patent Office 2,759,832
Patented Aug. 21, 1956

2,759,832

DRUM DRYING OF COOKED MASHED POTATOES

James Cording, Jr., Philadelphia, and Miles J. Willard, Jr., Glenside, Pa., assignors to the United States of America as represented by the Secretary of Agriculture No Drawing. Application November 15, 1954,
Serial No. 469,065

1 Claim. (Cl. 99—207)

(Granted under Title 35, U. S. Code (1952), sec. 266)

A non-exclusive, irrevocable, royalty-free license in the invention herein described, for all governmental purposes, throughout the world, with power to grant sublicenses for such purposes, is hereby granted to the Government of the United States of America.

This invention relates to the dehydration of cooked potatoes.

Many attempts have been made to use drum driers for dehydrating cooked, mashed potatoes, though heretofore none has been successful in producing a completely satisfactory product.

In our copending application, filed April 1, 1954, Serial No. 420,475, there is disclosed an improved process wherein cooked, mashed potatoes are dried on heated rolls, or a similar surface, to yield a superior product. The critical feature of that process was the application of the potatoes to the heated surface in a substantially monocellular layer. The product was thus obtained as a thin sheet or flake of about 0.004 to 0.010 inch thickness.

The present invention is a further modification and improvement of that described in our copending application identified above.

According to the invention, a superior quality of dehydrated, cooked, mashed potatoes is obtained by adding a suitable quantity of water to the cooked, mashed potatoes before they are fed to the drier. The dehydrated potatoes thus obtained are characterized by a denser, more uniform and less fragile flake; by a higher yield of flakes of optimum size and a lower yield of undesirable fine particles; and, of most importance, by an improved texture and appearance when reconstituted. These, and perhaps other, unrecognized factors are believed to account for the higher quality of the mashed potatoes obtained by reconstitution of the dehydrated product as determined by taste tests. The major recognized improvement in the reconstituted product is the improved texture, signified by the absence of the pasty consistency associated with extensive cell damage and resultant high content of free starch.

In order to produce dehydrated mashed potatoes of high quality it is essential that the potatoes be of a type that yields fresh mashed potatoes of high quality. Best results are obtained with high-solids potatoes, such as those of the Idaho Russet type. The cooked mash obtained from such potatoes typically contains 22 to 26% solids and seldom contains less than 20%. For best results, such mashed potatoes should be diluted to about 20% solids, or even to 18% in some cases, before drying them.

While dilution of the high-solids mashes aids in mechanical handling, especially in the application of thin, uniform denser films of potato to the heated surface of the drier, this is merely incidental to some obscure but more important effect. Thus, a mash of 20% solids prepared by diluting one of higher solids content yields a better product than does an undiluted mash of 20% solids.

Another surprising result of adding water to the mashed potatoes before drying is that the dehydrated product thus obtained contains less moisture than that from undiluted mash. Ths seemingly paradoxical effect is due to improvement in heat transfer from the heated surface of the drier to the film of mashed potato. Presumably, this improvement stems from the greater uniformity of the potato film and its closer adherence to the heated surface. This is illustrated by the data in Table I, obtained by drying three batches of mashed potatoes, both with and without dilution, on a double drum drier operated at constant speed (contact time, 16 sec.) and constant temperature of 316° F. (70 lb. steam). In all the runs the flake thickness of the product was held constant at about 0.007 inch.

Table I

EXAMPLE I

| Run No. | Percent Solids in Mash | Percent Moisture in Product |
|---|---|---|
| 1 | 24.5 | 6.0 |
| 2 | 21.3 | 4.4 |
| 3 | 20.3 | 3.0 |

EXAMPLE II

| | | |
|---|---|---|
| 1 | 20.0 | 5.6 |
| 2 | 16.5 | 3.9 |

EXAMPLE III

| | | |
|---|---|---|
| 1 | 23.2 | 8.0 |
| 2 | 19.2 | 3.3 |

In each of the examples in Table I, Run No. 1 was the undiluted mash while the other runs were on the same mash but diluted to the specified solids content. Not only did dilution of the mash yield a drier product in every example but it is clear that the drier product results specifically from the dilution and not merely from the lower solids content. Thus the product of Run No. 2 of Example I is drier than that of Run No. 1 of Example II, even though made from a mash of higher solids content, because it was made from a diluted mash.

The quality of the various products listed in Table I was determined by submission of the reconstituted mashed potatoes to a panel of taste experts. The order of preference of the products of the three examples was I—III—II. Within Example I the order of preference of the three runs was 3—2—1.

The sheets of dried potato obtained from the double drum drier were broken into flakes by forcing them through a 1-mesh sieve. Table II illustrates the correlation between the degree of dilution of the mashed potatoes before being dried and the yield and bulk density of the dried flakes. The yield data are for flakes that passed a 1-mesh but not a 2-mesh screen.

Table II

| Example No. | Percent Solids in Mash | Bulk Density | Yield, Percent |
|---|---|---|---|
| IV | 24.5 | 0.188 | 30.3 |
| V | 22.4 | .209 | 59.0 |
| VI | 21.3 | .222 | 61.0 |
| VII | 20.3 | .214 | 67.6 |

The mash used in Example IV was undiluted while that used in Examples V—VII was the same as that used in Example IV except that it was successively diluted to the indicated solids content. Both the bulk density and the yield reached a maximum at about 20% solids content and decreased as the mash was diluted below that point. (Mashes having lower initial solids content down to about 20% behaved similarly as they were diluted.)

In general, in practicing the invention, the potatoes are peeled, cooked, suitably by use of live steam at atmospheric pressure, mashed, diluted to a solids content in the range of about 18–22%, and preferably about 20%, and then dried by application of a thin film to a heated surface. A suitable drier is a conventional double drum drier internally heated by steam. The drums or rolls of the drier are spaced so as to apply a film of about 0.004 to .010 in. thickness to the rolls. This usually requires a roll clearance of about 0.005 to .015 in. The rolls are rotated at such a rate that the potatoes are reduced to the desired moisture content, usually about 5 to 10%. This ordinarily requires a contact time of about 10–20 sec. The sheets of dried potato thus obtained may then be suitably broken, screened and packaged.

We claim:

A process for dehydrating cooked, mashed potatoes comprising diluting the mashed potatoes with water to a solids content of about 18 to 22% and contacting a film substantially of monocellular thickness of the diluted mashed potatoes with a heated surface to reduce the moisture content of the film to about 5 to 10%.

References Cited in the file of this patent

UNITED STATES PATENTS

| | | |
|---|---|---|
| 1,908,489 | Sartakoff | May 9, 1933 |
| 2,481,122 | Kaufman et al. | Sept. 6, 1949 |
| 2,564,296 | Bostock | Aug. 14, 1951 |

FOREIGN PATENTS

| | | |
|---|---|---|
| 566,828 | Great Britain | Jan. 16, 1945 |